(12) United States Patent
Alterman et al.

(10) Patent No.: US 11,301,852 B2
(45) Date of Patent: Apr. 12, 2022

(54) SYSTEM AND METHOD FOR UPDATING ACCOUNT INFORMATION

(71) Applicant: VISA INTERNATIONAL SERVICE ASSOCIATION, San Francisco, CA (US)

(72) Inventors: Amy Alterman, San Francisco, CA (US); Jeffrey Sachs, Foster City, CA (US); Denise Raper, Austin, TX (US); Paul Spaeth, Half Moon Bay, CA (US); Aashish Bhargava, Foster City, CA (US); Traci Engle, Dublin, CA (US); Sameer Govila, Foster, CA (US); Lisa Doherty, San Jose, CA (US); David Richey, Hayward, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 735 days.

(21) Appl. No.: 14/931,462

(22) Filed: Nov. 3, 2015

(65) Prior Publication Data

US 2016/0125405 A1    May 5, 2016

Related U.S. Application Data

(60) Provisional application No. 62/074,556, filed on Nov. 3, 2014, provisional application No. 62/199,792, filed on Jul. 31, 2015.

(51) Int. Cl.
*G06Q 20/40* (2012.01)
*G06Q 20/42* (2012.01)
*G06Q 20/38* (2012.01)

(52) U.S. Cl.
CPC .......... *G06Q 20/40* (2013.01); *G06Q 20/385* (2013.01); *G06Q 20/42* (2013.01)

(58) Field of Classification Search
CPC ....... G06Q 20/40; G06Q 20/385; G06Q 20/42
See application file for complete search history.

(56) References Cited

U.S. PATENT DOCUMENTS 7,904,389 B2   3/2011   DiGioacchino
8,311,943 B2   11/2012  Patterson
(Continued)

OTHER PUBLICATIONS

The International Organization for Standardization (ISO), ISO 8583-1:2001(E) Financial transaction card originated messages—Interchange message specifications, Jun. 15, 2003, Tables A.1 and A.9 (Year: 2003).*

(Continued)

*Primary Examiner* — Bennett M Sigmond
*Assistant Examiner* — Marla Hudson
(74) *Attorney, Agent, or Firm* — Kilpatrick Townsend & Stockton LLP (57) ABSTRACT

Embodiments transmit user account updates to a transacting party within an authorization response message without receiving or requesting an inquiry from the transacting party. Both the old account information and the new account information may be included in the authorization response message sent to the transacting party. Accordingly, the updated account information is provided to the transacting party as a part of the transaction processing. The user account update may include a new account identifier assigned to the account, changes to the user information (e.g. name, address, etc.), changes to the information (e.g. expiration date, security code, etc.) associated with the account.

13 Claims, 5 Drawing Sheets

(56) References Cited

U.S. PATENT DOCUMENTS

| | | | |
|---|---|---|---|
| 8,706,622 B2 | 4/2014 | Winters et al. | |
| 2002/0004770 A1* | 1/2002 | Phillips | G06Q 20/102 705/34 |
| 2009/0171839 A1* | 7/2009 | Rosano | G06Q 20/403 705/40 |
| 2010/0211504 A1* | 8/2010 | Aabye | G06Q 20/10 705/44 |
| 2011/0093387 A1* | 4/2011 | Fuerstenberg | G06Q 20/102 705/40 |
| 2012/0265683 A1 | 10/2012 | da Silva et al. | |
| 2014/0032409 A1* | 1/2014 | Rosano | G06Q 20/401 705/44 |
| 2014/0258099 A1* | 9/2014 | Rosano | G06Q 20/409 705/39 |
| 2014/0289073 A1* | 9/2014 | Gold | G06Q 30/0639 705/26.9 |

OTHER PUBLICATIONS

Megan Geuss, "How Apple Pay and Google Wallet Actually Work", Oct. 29, 2014, Ars Technica, http://web.archive.org/web/20141031201253/https://arstechnica.com/gadgets/2014/10/how-mobile-payments-really-work/ (Year: 2014).*

* cited by examiner

SYSTEM AND METHOD FOR UPDATING ACCOUNT INFORMATION

RELATED APPLICATIONS

This application claims the benefit of and priority to U.S. Provisional Application No. 62/074,556, filed Nov. 3, 2014 and U.S. Provisional Application No. 62/199,792, filed Jul. 31, 2015, the entire contents of which are incorporated herein by reference in their entirety for all purposes.

BACKGROUND

Users regularly have account credentials (e.g., account identifiers, account expiration dates, tokens, etc.) reissued and/or updated. For example, a user may lose an account identification card (e.g. a payment card, a building entry card, etc.) and thereby compromise the account credentials stored on the account identification card. When the loss is reported, a new card with new credentials may be generated and issued to the user as a replacement.

During a transaction, users may interact with transacting parties to accomplish a desired outcome, such as purchasing goods or services, obtaining access to a building, obtaining access to a virtual location (e.g. database, a website, etc.). Transacting parties may store information associated with user accounts to process recurring transactions so that the user does not have to re-enter the account credentials at each transaction, or for any other suitable purpose. For example, in case of payment transactions, a transacting party (e.g. a merchant) may store the user's payment account information on a database. In the case of access transactions, a transacting party (e.g. building security administrator) may store the user's account information (e.g. credentials, employment status, etc.) in a database. In some instances, the information associated with an account used for conducting recurring transactions may change. For example, when an account identifier is compromised, a new account identifier and/or a new expiration date, security code, token representing the account identifier, etc. may be issued to the user. In such situations, the user needs to provide the new account information to each transacting party that the user has a standing recurring transaction arrangement. Other changes to the account information may include changes to the user name, user billing address, etc.

Conventional account information update services require the transacting parties to submit, to a central server computer (e.g. a transaction processing server computer), account identifiers for users with whom they have an ongoing recurring transaction relationship. The central server computer queries a database and provides responses to the transacting parties. The transacting parties update the stored account information (e.g. account-on-file) before requesting an authorization. The transaction processing server computer only responds to specific data elements within an inquiry file from a qualified transacting party. Responses may include account identifier updates, expiration date updates, dosed account advices and contact user advices.

According to other conventional account information update services, the issuer of an account may provide a file, which has new account information for the user to a transaction processing server computer in a batch manner. The file may also specify entities that can receive the new account information. For example, the file may specify that only certain transacting parties (e.g. acquirers or merchants) can receive the new account information. After the file is received, an acquirer associated with a transacting party can provide a separate file with account numbers associated with recurring transactions. The account numbers in the acquirer's file can be compared to the account numbers in the file received from the issuer. If there is a match, and if the transacting party is authorized to receive the new account information, the transaction processing server computer may allow the transacting party to continue processing recurring transactions using the new account information instead of the user's old account information.

There are a number of problems relating to updating account information in current recurring transaction systems. For example, in order to obtain the new account information, the transacting party needs to exchange files in a pre-determined format back and forth with the transaction processing server computer on a regular basis. Accordingly, the responsibility to obtain the updated information falls on the transacting parties. Most transacting parties are reluctant to assume this responsibility and implement issuer or transaction processing server computer imposed rules and formats for exchanging updated account information.

Embodiments of the present invention solve these problems and other problems, individually and collectively.

BRIEF SUMMARY

Embodiments of the present invention enable sending user account updates to a transacting party (e.g. a merchant) within an authorization response message without receiving or requesting an inquiry from the transacting party. In some embodiments, only the new account information is included in the transaction authorization response message. In other embodiments, both the old account information and the new account information may be included in the authorization response message sent to the transacting party. The user account update may include a new account identifier (e.g. a primary account number (PAN) assigned to the account), changes to the user information (e.g. name, address, etc.), changes to information associated with the account (e.g. the expiration date, security code, etc.).

Accordingly, embodiments enable an authorization response message sent to the transacting party to achieve two results in one pass of a message: (1) to notify the transacting party about the outcome of the transaction request (i.e. whether the transaction is approved or denied), and (2) to provide updated information (e.g. updated account information or any other information that may be communicated in a transaction environment) to the transacting party as part of the authorization process.

Embodiments provide a method including receiving, by a server computer, an authorization request message from a party to a transaction. The authorization request message includes information associated with an account. The authorization request message requests approval for the transaction using the account. The method further includes determining, by the server computer, that the account is associated with updated information. The method also includes modifying, by the server computer, the authorization request message to include the updated information, and processing, by the server computer, the modified authorization request message. The method further includes sending, by the server computer, an authorization response message including the updated information to the party. In some embodiments, the authorization response message further includes the information received from the party. The authorization response message may further include an indicator indicating that the information received from the party is replaced with the updated information. The authorization response message may also include an indicator indicating whether the transaction is approved or denied.

In some embodiments, the determining step of the method further includes receiving, by the server computer, an account update message from an entity managing the account when the information associated with the account is modified, and updating, by the server computer, a database storing information associated with the account using the updated information. The account update message includes the updated information associated with the account.

In some embodiments, the method may further include determining, by the server computer, that the account is allowed to be used in the transaction prior to modifying the authorization request message to include the updated information.

In some embodiments, the party may store the information associated with the account in a storage. The party may replace, in the storage, the information associated with the account with the updated information provided in the authorization response message.

According to various embodiments, the method may also include determining, by the server computer, that the information associated with the account provided in the authorization request message received from the party is deactivated.

Embodiments may also provide a method including sending, by a transacting party computer, an authorization request message to a server computer. The authorization request message includes information associated with an account. The authorization request message requests approval for a transaction using the account. The method may also include receiving, by the transacting party computer, an authorization response message in response to the authorization request message. The method may also include determining, by the transacting party computer, that the authorization response includes an updated information that is different from the information included in the authorization response message. The method may further include modifying the information stored by the transacting party computer in a storage with the updated information. The transaction may be a recurring transaction. The authorization response message may include an indicator indicating whether the transaction is approved or denied. The authorization response message may further include the information sent by the transacting party computer. The authorization response message may further include an indicator indicating that the information sent by the transacting party computer is replaced with the updated information.

In some embodiments, the method may also include sending, by the transacting party computer, a transaction settlement message including the updated information to the server computer to finalize the transaction.

Embodiments may also provide a system including a processor and a computer readable medium coupled to the processor. The computer readable medium comprises code, executable by the processor, to implement a method. The method may include receiving an authorization request message from a party to a transaction, determining that the account is associated with updated information, modifying the authorization request message to include the updated information, processing the modified authorization request message, and sending an authorization response message including the updated information to the party. The authorization request message includes information associated with an account. The authorization request message requests approval for the transaction using the account. The authorization response message further includes one or more of the information received from the party, and an indicator indicating that the information received from the party is replaced with the updated information. The authorization response message may include an indicator indicating whether the transaction is approved or denied.

In some embodiments, the system may also include a database for storing the information associated with the account. When the server computer receives an account update message from an entity managing the account, the server computer updates the information associated with the account on the database using the updated information. The account update message indicates that the information associated with the account is modified.

In some embodiments, the method implemented by the code further comprises determining that the account is allowed to be used in the transaction prior to modifying the authorization request message to include the updated information.

These and other embodiments are described in further detail below.

DETAILED DESCRIPTION

Embodiments are directed to methods, apparatuses, computer readable media and systems for providing account updates to a transacting party during a transaction. More specifically, a transaction processing server computer may receive a transaction approval request from a transacting party (e.g. a party to a transaction such as a merchant) upon a user initiating a transaction with the transacting party. Embodiments are directed to sending account updates to the transacting party within an authorization response message without receiving or requesting an inquiry from the transacting party. In some embodiments, the authorization response message may include both the old account information and the new account information. The user account update may include a new account identifier (e.g. a new primary account number (PAN)) assigned to the account, changes to the user information (e.g. name, address, etc.), changes to other information associated with the account (e.g. the expiration date, security code, etc.).

According to embodiments of the present invention, when information associated with a user account changes (e.g. a new account identifier, a new expiration date, updated user information such as name, address, etc.), the issuer (e.g. an entity managing the account) sends an update to a central server computer, e.g. a transaction processing server computer. The transaction processing server computer may be in communication with a database where the account information is stored. Upon receiving the update from the issuer, the transaction processing server computer updates the database with the issuer provided information, i.e. updated account information.

When the user initiates a transaction using the account or when it is time for a recurring transaction, the transacting party includes an account identifier (e.g. an account number, a token, etc.) associated with the account in a transaction authorization request message. For recurring transactions, the transacting party may store the account identifier on file. The transacting party may send the authorization request message to the transaction processing server computer. Upon receiving the authorization request message, the transaction processing server computer may check the database to determine if there is an update record associated with that account.

If there is an update record associated with the account, transaction processing server computer may generate an updated authorization request message by replacing the old account information with the new account information (e.g. transaction processing server computer replaces the old account number with the new account number) in the authorization request message. The transaction processing server computer may send the updated authorization request message to the issuer. The issuer verifies the information in the updated authorization request and either approves or denies the transaction. The issuer sends a transaction authorization response message to the transaction processing server computer indicating whether the transaction is approved or denied. In some embodiments, upon receiving the authorization response message from the issuer, the transaction processing server computer may modify the authorization response message to include both the new account information and the old account information or to include an indicator (e.g. a flag) indicating that the account information has been updated. The transaction processing server computer may send the authorization response message (or the modified authorization response message) to the transacting party.

In some embodiments, the transaction processing server computer may be authorized to approve or decline the transaction request on behalf of (OBO) the issuer. In such embodiments, the transaction processing server computer may generate the authorization response message without interacting with the issuer. The transaction processing server computer may include the new account information (and, in some embodiments, the old account information) in the authorization response message, and send the authorization response message to the transacting party.

As such, the transacting party is notified of the updated account information during the processing of the transaction (e.g. as part of the authorization process). Thus, the transacting party is notified of the updated account information without the transacting party having to inquire about the update or exchange files with the transaction processing server computer prior to sending the authorization request message.

Upon receiving the updated account information, the transacting party may update their own records to associate the new account information with the account or user profile stored on their systems. In some embodiments, the transacting party may use an acquirer provided service that stores the account information on behalf of the transacting party. Upon receiving the updated account information, the transacting party may request the acquirer to update the account information in their system.

Before discussing specific embodiments and examples, some descriptions of terms used herein are provided below.

An "account identifier" may include any suitable information associated with an account of a user which identifies the account. Such information may be directly related to the account or may be derived from information related to the account. For example, an account identifier may include an account number, an employment identification number, a virtual account identifier, a primary account number (PAN), a token, a service code, a CVV (card verification value), a dCVV (dynamic card verification value), CVV2 (Card Verification Value 2), CVC3 card verification values, an expiration date, etc. CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors). The PAN may be a variable length, (e.g. 13 to 19-digit) industry standard-compliant account number that is generated within account ranges associated with a Bank Identification Number (BIN) by an issuer.

A "token" may include an identifier for an account that is a substitute for account data, such as an account number. For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing transaction processing server computers. In some embodiments, a token may be used in place of an account number to initiate, authorize, settle or resolve a transaction or represent the original credential in other systems where the original credential would typically be provided. In some embodiments, a token value may be generated such that the recovery of the original account number or other account identifier from the token value may not be computationally derived. Further, in some embodiments, the token format may be configured to allow the entity receiving the token to identify it as a token and recognize the entity that issued the token.

As used herein, a "user device" may comprise any electronic and/or communication device. In some cases, it may be transported and operated by a user. The user device may include a mobile device, which may also provide remote communication capabilities with resources via one or more processing server computers. Examples of mobile devices include mobile phones (e.g., cellular phones), personal digital assistants (PDAs), tablet computers, laptop computers (e.g., netbooks), personal music players, hand-held electronic reading devices, wearable computing devices, etc. In some embodiments, the user device may include a payment device. For example, suitable payment devices include, but are not limited to, smart cards, magnetic stripe cards, keychain devices (such as the SPEEDPASS™ commercially available from Exxon-Mobil Corp.), cellular phones, personal digital assistants (PDAs), pagers, payment cards, security cards, access cards, smart media, transponders, 2-D barcodes, an electronic or digital wallet, and the like. Such devices can operate in either a contact or contactless mode (e.g. via a contactless interface of the payment device).

A "server computer" may typically be a powerful computer or cluster of computers. For example, the server computer can be a large mainframe, a minicomputer cluster, or a group of servers functioning as a unit. The server computer may be associated with an entity such as a payment processing server computer, a wallet provider, a merchant, an authentication cloud, an acquirer or an issuer.

An "issuer" can include an entity that issues an account. The account (which may be associated with one or more user devices) may refer to any suitable account including payment accounts (e.g. a credit card account, a checking account, a savings account, a merchant account assigned to a consumer, a prepaid account, etc.), an employment account, an online account (e.g. email account, database subscription account, etc.).

A "transacting party" is an entity that conducts a transaction. It can be an entity that engages in transactions and can sell goods or services, or provides access to goods or services. For example, a transacting party may include a merchant.

An "acquirer" is typically a business entity (e.g., a commercial bank) that has a business relationship with a particular transacting party or other entity. Some entities can perform both issuer and acquirer functions. Some embodiments may encompass such single entity issuer-acquirers.

A "transaction processing server computer" may refer to a computer that processes a transaction. In some embodiments, it can be in an electronic system used to accept, transmit, or process transactions made by user devices for money, goods, or services. The transaction processing server computer may transfer information and funds among issuers, acquirers, transacting parties, and users. An example of the transaction processing server computer may include a payment processing server computer such as VisaNet™, operated by Visa®. Payment processing server computers such as VisaNet™ are able to process credit card transactions, debit card transactions, and other types of commercial transactions. VisaNet™, in particular includes a Visa Integrated Payments (VIP) system which processes authorization requests and a Base II system which performs clearing and settlement services.

A "user" may include an individual or an entity that uses a system. A user may be associated with one or more accounts and/or user devices. In some cases, the user may also be referred to as a cardholder, account holder, or consumer.

Embodiments enable a server computer, such as a transaction processing server computer, to notify a transacting party of update(s) associated with a user account via an authorization response message sent to the transacting party. Specifically, for those transacting parties that already have a standing recurring payment relationship with a user, the transaction processing server computer sends accounts updates in an authorization response message that is sent to the transacting party in response to an authorization request message.

Figure 1A:
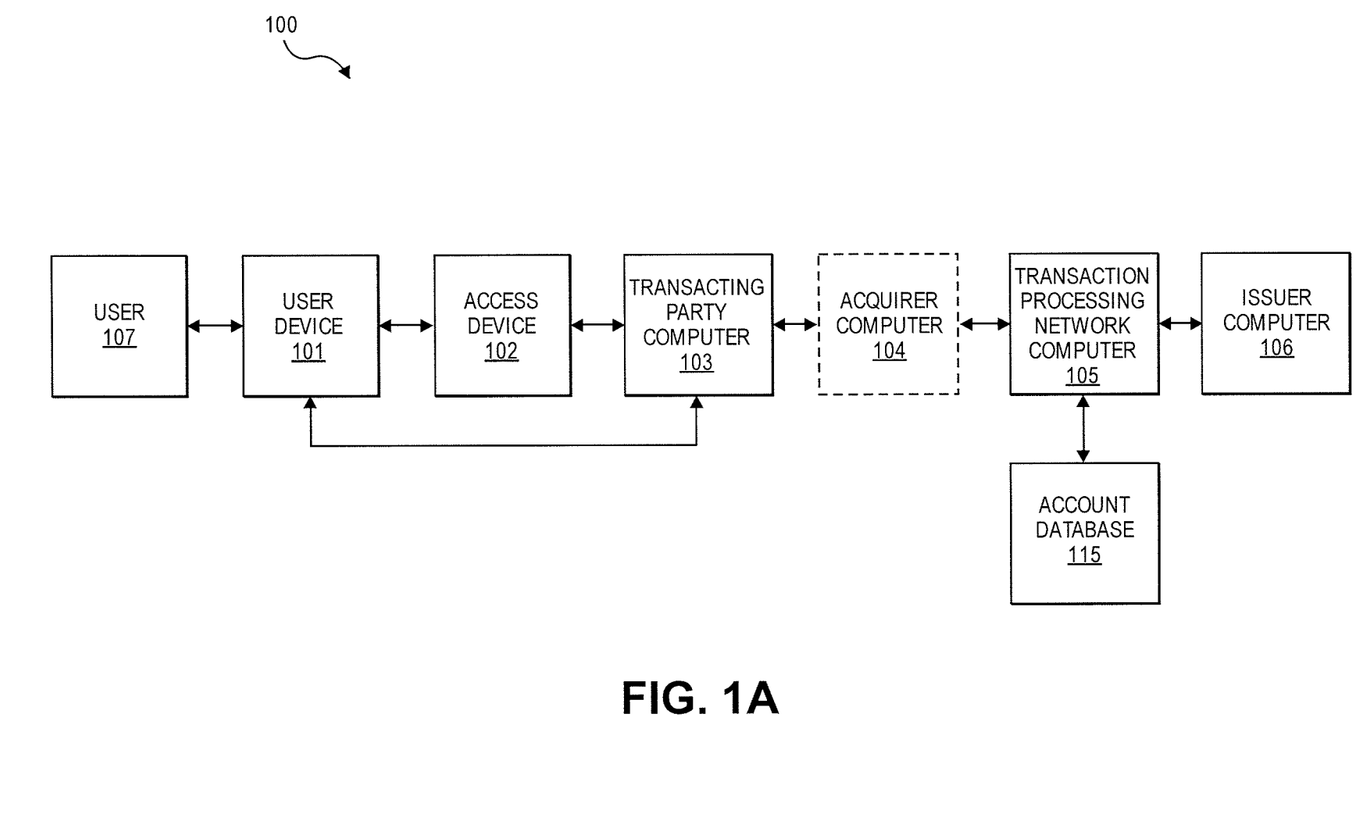
FIG. 1A illustrates a block diagram including entities in a payment transaction system in accordance with embodiments of the present application.
Figure 1B:
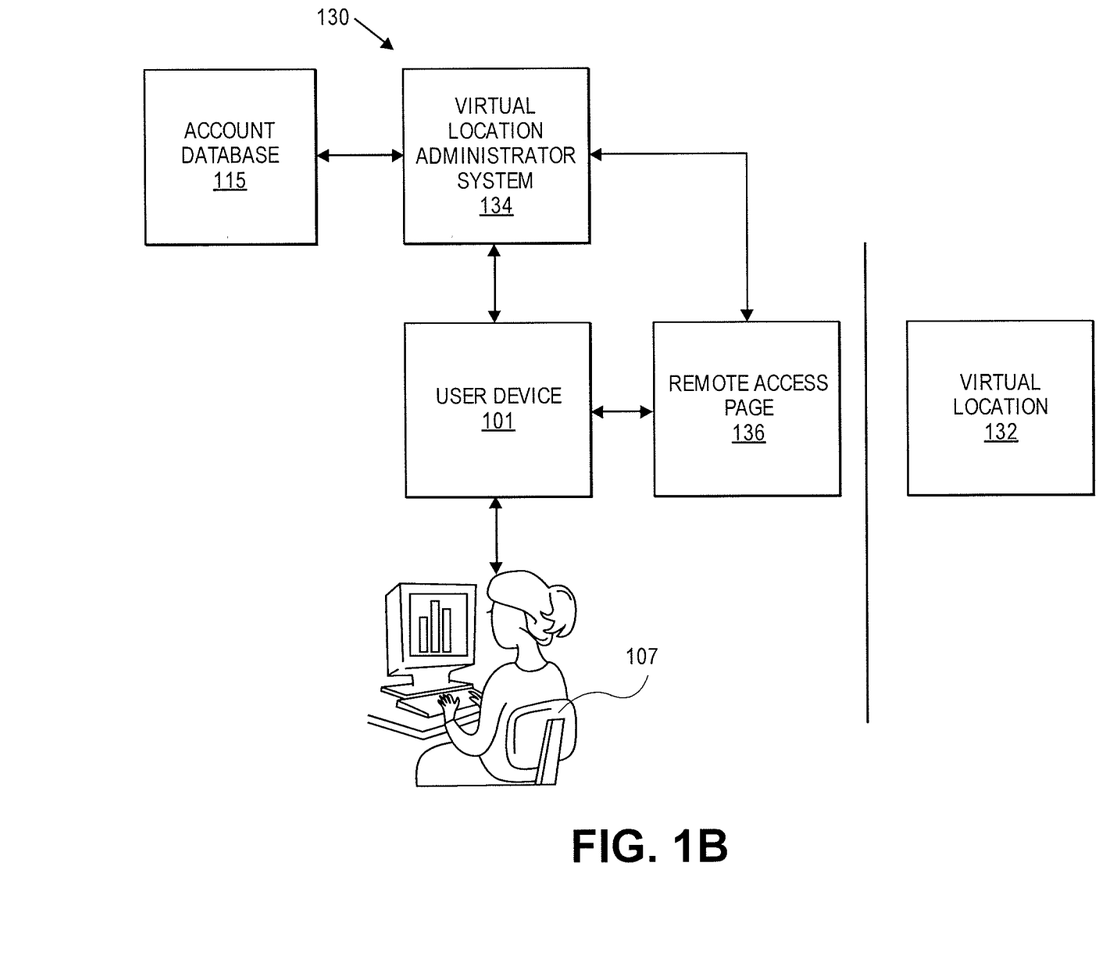
FIG. 1B shows a block diagram of a virtual location access system in accordance with embodiments of the present application.

Embodiments may be implemented using a transaction processing system such as a payment transaction system (as illustrated in FIG. 1A) or a virtual location access transaction system (as illustrated in FIG. 1B). These systems are discussed below in greater detail.

FIG. 1A illustrates a block diagram including entities in a payment transaction system 100. This depicted payment transaction system 100 includes a user 107, a user device 101, an access device 102, a transacting party (e.g. a merchant) computer 103, an acquirer computer 104, a transaction processing server computer 105 in communication with an account database 115, and an issuer computer 106. Each of the entities shown in FIG. 1A may be in communication with each other.

The user 107 may use the user device 101 to conduct a transaction (e.g., a payment transaction) at the access device 102 connected to the transacting party computer 103. In some embodiments, the transacting party computer 103 may be connected to the acquirer computer 104. The acquirer computer 104 may communicate with the issuer computer 106 via the transaction processing server computer 105. Some or all of the entities depicted in FIG. 1A as connected may be connected across one or more communication networks or may be directly connected.

In this example, the transacting party is an entity that engages in transactions and may sell (or provide) goods and/or services. In this example, the issuer is a business entity (e.g., a bank) that maintains accounts for users and may issue account credentials to be stored on the user device 101 (e.g., a cellular telephone, smart card, tablet, laptop, etc.) of the user 107. In this example, the acquirer is typically a business entity (e.g., a bank) that has a business relationship with a particular transacting party or other entity. Some entities can perform both issuer and acquirer functions, and some embodiments may encompass such single entity issuer-acquirers. Each of the entities (e.g., transacting party computer 103, acquirer computer 104, transaction processing server computer 105, and issuer computer 106) may comprise one or more computer apparatuses (e.g. servers) to enable communications or to perform one or more of the functions described herein.

The user device 101 may be used to conduct a transaction, and the transaction may be to provide account information to the transacting party computer 103. In some configurations, the user device 101 directly interacts with the access device 102 (i.e., without the use of any other device and/or network), but in some configurations user device 101 communicates with the access device 102 using an intermediary device and/or a communication network. The user device 101 may interact with the access device 102 (e.g., using near field communications (NFC)) and/or the transacting party computer 103 (e.g., via the Internet to access a website or utilize an application provided by transacting party computer 103) to initiate and/or conduct a transaction.

The transaction processing server computer 105 may include a payment processing server computer including data processing subsystems, processing server computers, and operations used to support and deliver certificate authority services, authorization services, exception file services, and clearing and settlement services. In some embodiments, transaction processing server computer 105 may conduct transactions in substantially real-time (e.g., in fewer than a few seconds or fractions of a second).

In an exemplary purchase transaction, the user 107 purchases a good or service at from a transacting party using the user device 101 (e.g., a mobile phone or a payment card). The user device 101 can interact with the access device 102 associated with the transacting party computer 103. For example, the user 107 may tap the user device 101 against an NFC reader of the access device 102. Alternatively, the user 107 may indicate payment details to the transacting party electronically, such as using a digital wallet or in through an online transaction. In some purchase transactions the user device 101 may not utilize an access device 102, and may directly interact with a transacting party computer 103 (e.g., a computing system providing a transacting party website or "backend" services for a transacting party application executing on the user device 101). In these examples, the transacting party computer 103 may be thought of as implementing a virtual access device.

To cause the transaction to be performed, an authorization request message is generated by the transacting party computer 103, the access device 102 (or virtual access device, which may be at transacting party computer 103) and is forwarded to the acquirer computer 104. The acquirer computer 104 is a system of an acquirer (as discussed above) providing an account of the transacting party, which will ultimately receive the funds for the transaction from an issuer providing the user's account. The authorization request message may be an electronic message that is sent to the transaction processing server computer 105 and/or the issuer of the user account (e.g., issuer computer 106) to request authorization for a transaction.

An authorization request message, according to some embodiments, may comply with a message type defined by the International Organization for Standardization (ISO) 8583 standard, which is a standard for systems that exchange electronic transaction information associated with payments made by users using a payment device (which could be the user device 101) or payment account. The authorization request message may include an issuer account identifier that may be associated with a user device or account. An authorization request message may also comprise additional data elements corresponding to "identification information" including, by way of example only: a service code, a CVV (card verification value), a dCVV (dynamic card verification value), an expiration date, etc. An authorization request message may also include "transaction information," such as any information associated with a current transaction, such as the transaction amount, transacting party identifier, transacting party location, etc., as well as any other information that may be utilized in determining whether to identify and/or authorize a transaction using the user's account. The authorization request message may also include other information, such as an identifier of the access device 102 that generated the authorization request message, information about the location of the access device 102, etc.

Typically, an authorization request message will include a field for an account identifier (e.g. one or more of an account number, an expiration date of the account, a security code associated with the account, etc.) associated with the account of the user 107 that was provided by the user device 101. After receiving the authorization request message, the acquirer computer 104 will send the authorization request message to the transaction processing server computer 105.

The transaction processing server computer 105 may query an account database 115 to check whether account information associated with the account identified by the account identifier has been updated. If the transaction processing server computer 105 determines that the account information has been updated (i.e. new account information is associated with the account in the account database 115), the transaction processing server computer 105 may modify the authorization request message to replace the old account identifier with the new account identifier. The transaction processing server computer 105 then forwards the modified authorization request message to the issuer computer 106 associated with the issuer of the user's account. The new account identifier included in the authorization request message may be used by the transaction processing server computer 105 to identify the appropriate issuer computer 106 for the purpose routing or processing the message.

After the issuer computer 106 receives the authorization request message, the issuer computer 106 sends an authorization response message back to the transaction processing server computer 105 to indicate whether or not the current transaction is authorized. An authorization response message may be an electronic message reply to an authorization request message. In some embodiments, it may be generated by an issuing financial institution or a payment processing server computer, and may comply with the ISO 8583 standard. The authorization response message may include, by way of example only, one or more of the following status indicators: Approval—transaction was approved; Decline—transaction was not approved; or Call Center—response pending more information, transacting party must contact the issuer for authorization. The authorization response message may also include an authorization code, which may be a code that an issuer returns in response to an authorization request message in an electronic message (either directly or through the payment processing server computer) to the access device 102 (e.g. point-of-sale (POS) equipment) that indicates an approval of a transaction, and may serve as proof of authorization.

The transaction processing server computer 105 receives the authorization response message from the issuer computer 106. In some embodiments, the transaction processing server computer 105 may modify the authorization response message to include the old account identifier along with the new account identifier and/or to include an indicator (e.g. a flag) that indicates that account information associated with the account has been updated. The transaction processing server computer 105 transmits the authorization response message (or the modified authorization response message) to the acquirer computer 104. The acquirer computer 104 then sends the authorization response message back to the transacting party computer 103, where the transacting party can determine whether to proceed with the transaction.

After the transacting party computer 103 receives the authorization response message, the access device 102 may then provide an authorization response message for the user 107. The at least some of the information in the authorization response message may be displayed by a display device (e.g., a display device that is part of or coupled to the access device 102), printed out on a receipt, communicated to the user device 101, etc. Alternately, if the transaction is an online transaction (e.g., via a website or application), the transacting party computer 103 may provide a web page, display module, or other indication of the authorization response message to the user device 101.

At the end of the day, a normal clearing and settlement process can be conducted by parties of the payment transaction system 100. A clearing process is a process of exchanging financial details between and acquirer and an issuer to facilitate posting to a user's payment account and reconciliation of the user's settlement position. However, it should be noted that embodiments of the invention are not limited to a single settlement process.

In some embodiments, the user device may be used to obtain access to a virtual resource (e.g. a database) or a location (e.g. a website). For example, the user device may include data which is passed to a virtual access device (remote access webpage) to allow the user to access the virtual resource. For example, a virtual location administrator system may provision the user device (e.g. user computer) with access data that allows the user to access the virtual resource. Once the user device is provisioned with access data, it may be used to conduct an access transaction. When the user device provides the provisioned access data to the remote access page associated with the virtual location, access may be granted to the user.

FIG. 1B illustrates an exemplary virtual location access system 130 including a user device that is provisioned with access data and that can allow a user to access a virtual location such as a database or a website.

The virtual location access system 130 may include a virtual location administrator system 134 (e.g. an exemplary transaction processing server computer). In some embodiments, the virtual location administrator system 134 may be a streaming media provider (e.g. an online movies streaming or musing streaming service system), an online service provider (e.g. an email service provider, an online research service provider), etc. The virtual location administrator system 134 may require a user to have an account (e.g. a subscription to the services) to access the services provided by the virtual location administrator system 134. To open and/or maintain an account, the user 107 may provide personal identification information and/or financial information to the virtual location administrator system 134. The virtual location administrator system 134 may generate an account for the user 107 and store at least a portion of the user-provided data at the account database 115. The virtual location administrator system 134 may provide account identifying information to the user 107.

In some embodiments, the virtual location administrator system 134 may be in communication with the user device 101 of the user 107 to provision the user device 101 with access data that may allow the user 107 to access the virtual location 132. To gain access to the virtual location 132 (e.g. to initiate a transaction request), the user device 101 may interact with the remote access page 136 and pass the account information (e.g. the account identifying information provided to the user 107 by the virtual location administrator system 134 or the access data provisioned on the user device 101 by the virtual location administrator system 134) to the remote access page 136. The remote access page 136 may query the account database 115 to verify the received account information. If the account information is verified, the user 107 may be granted access to the virtual location 132. For example, the remote access page 136 may display the contents of the virtual location 132 on the user device 101 and allow the user 107 to download, stream, read, and/or write the contents of the virtual location 132.

In some embodiments, the virtual location administrator system 134 may update the account information associated with the user 107. For example, the virtual location administrator system 134 may assign a new account identifier to the user 107. The virtual location administrator system 134 may update the records on the account database 115.

The overall account update process may include steps performed prior to a transaction request and steps performed after the transaction request (i.e. during transaction processing). Prior to the initiation of the transaction, the issuer may send one or more account update messages to the transaction processing server computer. The account updates may include changes to the account information (e.g. account number (e.g. primary account number (PAN)), token, expiration date, security code, billing address, user name, etc.). The issuer may also include parameters in the account update message such as which transacting party can be notified of the changes to the account identifying information, and how the transaction processing server computer should handle transaction requests associated with the accounts that have new identifying information (e.g. decline transaction requests for blocked accounts on behalf of the issuer, etc.). Upon receiving the account update messages from the issuer, the transaction processing server computer may update account records stored at a secure storage, such as an account database, with the information received from the issuer. Updating account information for an account on the database may generate a flag or an update record for that account.

After the user initiates the transaction with the transacting party, the transacting party generates and sends an authorization request message to the transaction processing server computer via, for example, an acquirer. The authorization request message may be associated with a recurring transaction such that the transacting party may already have the account identifying information, e.g. the PAN or token, on file. Thus, the transacting party may include the account information known to the transacting party in the authorization request message.

Upon receiving the authorization request message, the transaction processing server computer may check the database to determine whether there is an update record associated with the account identified in the authorization request message. If there is no update record for the account, the transaction processing server computer may process the authorization request message (e.g. send the authorization request message to the issuer, decline the request on behalf of the issuer, or approve the request on behalf of the issuer).

If there is an update record for the account, the transaction processing server computer may modify the authorization request message to replace the account information (received from the transacting party) with the new account information retrieved from the database and send the modified authorization request message to the issuer. The transaction processing server computer may also include an identifier in the modified authorization request message indicating that an account update has occurred. The issuer may analyze the account details and either approve or decline the transaction. The issuer may then generate an authorization response message to the transaction processing server computer. In some embodiments, upon receiving the authorization response message from the issuer, the transaction processing server computer modifies the authorization response message to include the old account information along with the new (i.e. updated) account identifying information. The transaction processing server computer sends the modified authorization response message to the transacting party via the acquirer. If the transaction is approved, the transacting party may clear the transaction using the new account identifying information. The transacting party may update their internal records with the new account identifying information.

In embodiments where the transaction processing server computer can approve or deny the transaction request on behalf of the issuer, the transaction processing server computer may generate the authorization response message without interacting with the issuer. The transaction processing server computer may include (i) only the new account information or (ii) both the old account information and the new account information in the authorization response message and send the authorization response message to the transacting party, for example, via the acquirer.

Accordingly, embodiments of the present invention enable an authorization response message sent to the transacting party to achieve two results with a same message: (1) to notify the transacting party about the outcome of the transaction request (i.e. whether the transaction is approved or denied), and (2) to provide updated information (e.g. updated account information or any other information that may be communicated in a transaction environment) to the transacting party.

Figure 2:
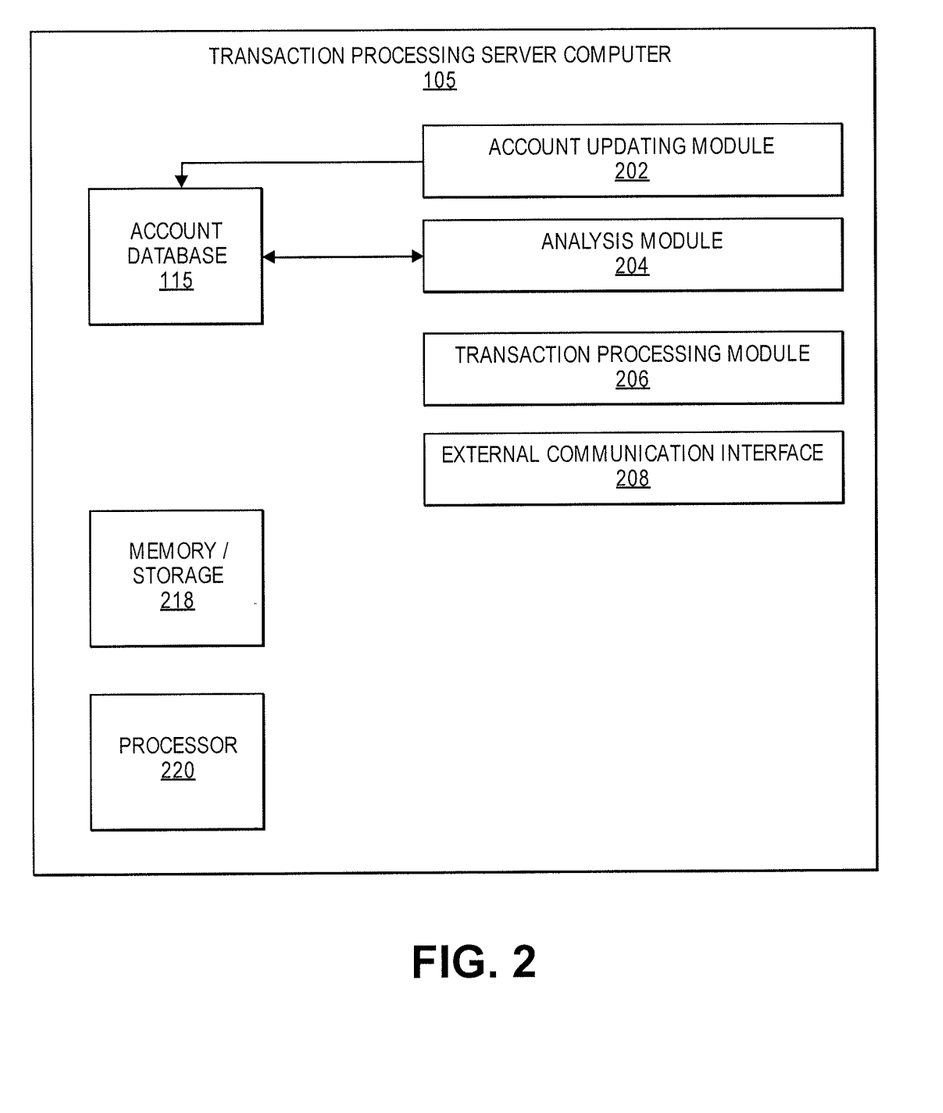
FIG. 2 shows a block diagram of an exemplary transaction processing server computer, in accordance with some embodiments of the invention.

As provided above, before processing a transaction request (either on site or by communicating with an issuer of the account used in the transaction), the transaction processing server computer 105 may query an account database 115 to determine whether account information associated with the account has been updated. FIG. 2 illustrates the components of an exemplary transaction processing server computer 105 according to an embodiment of the invention.

The transaction processing server computer 105 may include an account database 115 where information associated with user accounts is stored. For example, account identifier (e.g. account number), user identifying information (e.g. user name, address, alias, social security number, etc.), security codes, etc. associated with an account may be stored in connection with that account on the database 115. When an issuer of an account updates information associated with the account, the issuer notifies the transaction processing server computer 105 of the update. For example, the transaction processing server computer 105 may receive the update notification and the updated new account information via an external communication interface 208. Upon receiving the update notification and the updated new account information from the issuer, the transaction processing server computer 105 updates the account database 115 using an account updating module 202, in conjunction with the processor 220. For example, the account updating module 202, working in conjunction with the processor 220, may access the account database 115, retrieve the entry for the account identified by the account identifying information, and replace the old account information with the new account information received from the issuer. Updating the information associated with an account in the account database 115 may generate an update record for that account. Even though the account database 115 is illustrated as a part of the transaction processing server computer 105 in FIG. 2, one of ordinary skill in the art will appreciate that the account database 115 may be external to and accessible by the transaction processing server computer 105.

When a user initiates a transaction with a transacting party, the computer operated by the transacting party generates a transaction authorization request message and sends the transaction authorization request message to the transaction processing server computer 105. The transaction authorization request message may include, among other information, account identifying information (e.g. information associated with an account). The transaction processing server computer 105 may receive the transaction authorization request message via the external communication interface 208.

Upon receiving the transaction authorization request message, a transaction analysis module 204 of the transaction processing server computer 105, working in conjunction with the processor 220, may query the account database 115 to determine whether the account identified by the account information included in the transaction authorization request message had an update record. If the transaction analysis module 204, working with the processor 220, determines that the account is associated with an update record (e.g. information associated with the account has been updated in the account database 115), the transaction analysis module 204, in conjunction with the processor 220, retrieves the new account information from the account database 115 and provides the new account information to a transaction processing module 206 of the transaction processing server computer 105.

In some embodiments, the transaction analysis module 204, working with the processor 220, may determine whether the account identified by the account identifying information provided in the transaction authorization request message is allowed to be used in the transaction. For example, the transaction analysis module 204, in conjunction with the processor 220, may determine whether the account is closed (e.g. deactivated). In such cases, the transaction processing server computer 105 may notify the transacting party that the account has been deactivated, and that the transacting party should contact the user to obtain new account information. In some embodiments, the user of the account may indicate that they do not want the updated account information to be shared with certain transacting parties. In such cases, the transaction analysis module 204 and the processor 220 may determine whether the user of the account declined sharing the updated account information with the transacting party sending the transaction authorization request message. Yet in other embodiments, the account may be restricted for use in connection with predetermined types of transactions. For example, the account may be restricted for use with transaction based on transaction location, transaction value, transaction time, etc. In such cases, the transaction analysis module 204 and the processor 220 may determine whether the account is authorized for use in connection with the specific transaction identified in the transaction authorization request message.

The transaction processing module 206 and the processor 220 may modify the transaction authorization request message to replace the account information provided by the transacting party with the new account information retrieved from the account database 115. The transaction processing module 206 and the processor 220 may then approve/decline the transaction request or transmit the modified transaction authorization request message to the issuer. Upon receiving the transaction authorization request message, the issuer may process the transaction authorization request message and determine whether the request should be approved or declined. The issuer may provide a transaction authorization response message to the transaction processing server computer 105. The transaction processing server computer 105 may receive the transaction authorization response message via the external communication interface 208.

In some embodiments, the transaction processing module 206 and the processor 220 of the transaction processing server computer 105 may modify the transaction authorization response message received from the issuer to incorporate the old account information (e.g. the account information received from the transacting party) along with the new account information. The transaction processing server computer 105 may also modify the transaction authorization request message to incorporate an indicator (e.g. a flag) indicating that account information has been modified. The transaction processing server computer 105 may send the transaction authorization response message (or the modified transaction authorization response message) to the transacting party. The indicator may alert the transacting party that the account information has been modified and that the transacting party should update their records.

The transaction processing server computer 105 may also include a system memory 218 comprising one or modules to generate and utilize electronic messages, and the data processor 220 for facilitating a transaction and the exchange of electronic messages. According to some embodiments, the account database 115 may be stored at the system memory 218.

Figure 3:
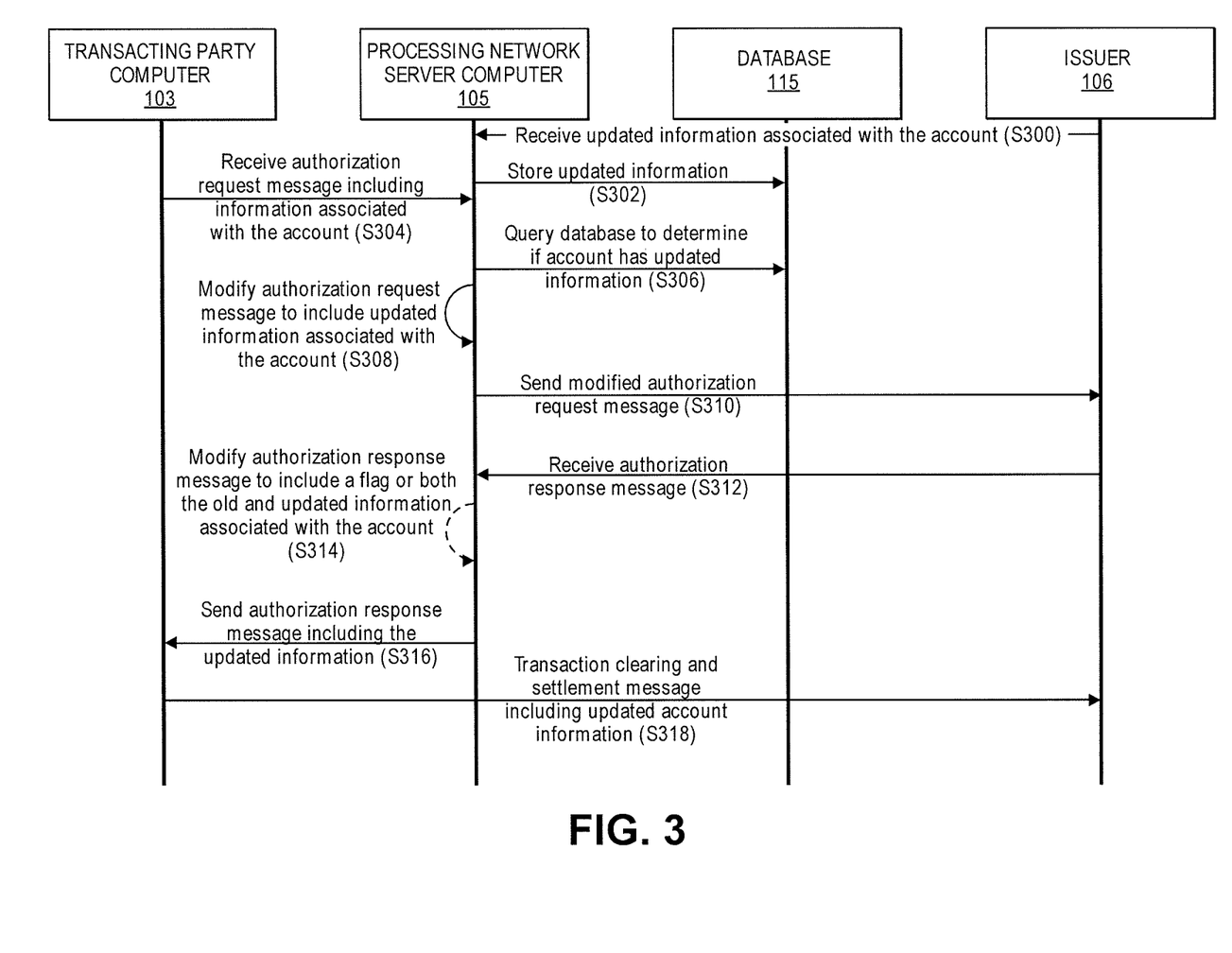
FIG. 3 illustrates a system and a flow diagram of a processing system for providing updated account information in an authorization response message, in accordance with some embodiments of the invention.

FIG. 3 illustrates a system and a flow diagram of a processing system for providing updated account information in an authorization response message. At S300, the transaction processing server computer 105 receives an account update message from an issuer computer 106. The account update message may include updated account information associated with one or more accounts. The account information may include an account number (e.g. a PAN), a token representing the account number, an expiration date, a security code, a user name, a billing address, etc.

At S302, the transaction processing server computer 105 updates entries in an account database 115 associated with the one or more payment accounts using the updated account information provided by the issuer computer 106. Updating an entry associated with an account creates an update record for that account. In some embodiments, a flag may be associated with the entry to indicate that the information for that account has been updated.

At S304, the transaction processing server computer 105 receives an authorization request message from a transacting party computer 103, and optionally via an acquirer computer (not shown). The authorization request message may include account information associated with an account. The authorization request message may request a transaction using the account. According to various embodiments, the authorization request message may be for a recurring transaction request from the account. For example, the authorization request message may be for a recurring payment transaction request from a payment account. Thus, the transacting party computer 103 may already have the account information stored on file for the pre-existing recurring transaction relationship with the account holder.

At S306, the transaction processing server computer 105 queries the account database 115 to determine if there is an update record associated with the account identified in the authorization request message received from the transacting party computer 103. The update record may include updated account information associated with the account. For example, the updated account information may include a new account identifier (account number), a new token, a new expiration date, a new security code, etc. assigned to the account. If there is an update record for the account, the transaction processing server computer 105 retrieves the updated account information from the account database 115.

At S308, the transaction processing server computer 105 processes the transaction authorization request message. The processing may include approving the transaction on behalf of (OBO) the issuer of the account, declining the transaction on behalf of the issuer, or interacting with the issuer (e.g. sending a transaction authorization request message to the issuer). In some embodiments, the transaction processing server computer 105 may approve or decline the transaction request on behalf of the issuer, i.e. without sending the authorization request message to the issuer. In other embodiments, if the transaction processing server computer 105 is not authorized to process the transaction request on behalf of the issuer, the transaction processing server computer 105 generates a modified authorization request message by replacing the account information received from the transacting party computer 103 with the updated account identifying information. At S310, the transaction processing server computer 105 sends the modified authorization request message to the issuer computer 106.

Upon receiving the modified authorization request message from the transaction processing server computer 105, the issuer computer 106 generates an authorization response message and sends the authorization response message to the transaction processing server computer 105. The authorization response message may include an indicator indicating whether the transaction request has been approved or denied by the issuer. At S312, the transaction processing server computer 105 receives the authorization response message.

In some embodiment, at S314, the transaction processing server computer 105 may modify the authorization response message to incorporate an indicator (e.g. a flag) indicating that account information has been updated. Alternatively, or in addition, the transaction processing server computer 105 may modify the authorization response message to include the old account information (i.e. the account information received from the transacting party computer 103) along with the new account information (i.e. the updated account information received from the issuer computer at S300 and retrieved from the account database at S306). That is, the modified authorization response message may include both the old account information and the new account information. In other embodiments, the authorization response message may include only the new account information.

In embodiments where the transaction processing server computer acts on behalf of the issuer, the transaction processing server computer 105 may generate the authorization response message that approves or declines the transaction request.

At S316, the transaction processing server computer 105 sends the authorization response message (either as received from the issuer computer 106 at S312, or as modified by the transaction processing server computer 105 at S314) to the transacting party computer 103, thus notifying the transacting party (i) of the outcome of the transaction request, and (ii) of the updated account information.

In some embodiments, upon receiving the updated account information, the transacting party computer 103 may update its internal records to store the updated account information. Accordingly, for the next recurring transaction, the transacting party may use the updated account information. If the authorization response message includes both the old account information and the new account information, the transacting party computer 103 may identify their record for the account identified by the old account information, and may replace the old account information with the new account information. Similarly, if the authorization response message includes an identifier indicating that the account information has changed, thus prompting the transacting party computer 103 to update their record for the account. In other embodiments, if authorization response message includes the new account information, the transacting party computer 103 may identify the correct account record based on the association between the authorization response message received in response to the authorization request message sent by the transacting party computer 103. By comparing the authorization response message to the authorization request message, the transacting party computer 103 may determine that the information associated with account has changed, and may replace the old account information stored on their system with the new account information provided in the authorization response message.

At a later point in time, at S318, the transacting party computer 103 may send a transaction clearing and settlement message including the updated account information to the issuer computer 106. That is, the clearing and settlement of the transaction is performed using the updated account information.

Embodiments of the invention have a number of advantages. For example, in embodiments of the invention, a transacting party (e.g. a card-on-file merchant) can receive updated account information during a transaction. As a result, rejected transactions due to outdated account information are reduced. Additionally, updated account information can be distributed to the transacting parties in a simple, efficient, fast, and easy manner. Instead of the user having to contact the transacting party to update the account information when the account information has changed, and instead of transacting parties having to send regular requests for updated account information to the transaction processing server computer, updated account information can be immediately provided on a case-by-case basis when needed. Further, each and every transacting party may not be updated whenever there is new account information. Instead, updated account information can be provided only to the transacting parties that submit transaction requests for an account with updated account information. Thus, transacting parties that are not actively using the account may not receive updated account information, such that less messages and communication resources (e.g. bandwidth) are wasted sending updated information to entities that do not need it.

Further advantages include allowing transactions to be authorized even if a transacting party submits outdated account information. Instead of rejecting the transaction, the transaction processor can obtain the updated account information, which can then be used for authorizing the current transaction. Thus, instead of experiencing a rejected transaction, a transacting party can both have the transaction approved and receive the updated account information. A transacting party may effectively always have up-to-date account information, as outdated account information sent in a transaction request may still result in an approved transaction. Further, utilizing an existing transaction flow process to distribute updated account information provides an efficient added benefit to an existing process, as a single message flow can be used both for authorizing transactions and distributing updated account information. It is particularly efficient and appropriate because the moment when updated account information is needed may be the moment when a transaction request involving the account is submitted.

Advantages provided by the embodiments further include notifying the transacting entities of closed accounts in the first authorization response message sent to the transacting party. Embodiments prevent the transacting party from sending subsequent transaction authorization request messages for a closed account. Specifically, upon receiving an authorization request message from a transacting party, the transaction processing server computer may check the account information. For those accounts that are closed, the transaction is blocked. The transaction processing server computer may send the status information to the transacting party in the authorization response message denying the transaction. Thus, the transacting party is notified of the account closed status at the first authorization request attempt. Accordingly, the transacting party will not be sending any further authorization request messages knowing that the account is now closed. This reduces the amount of messages between the transacting party and the transaction processing server computer, and provides early account status notification to the transacting party.

Figure 4:
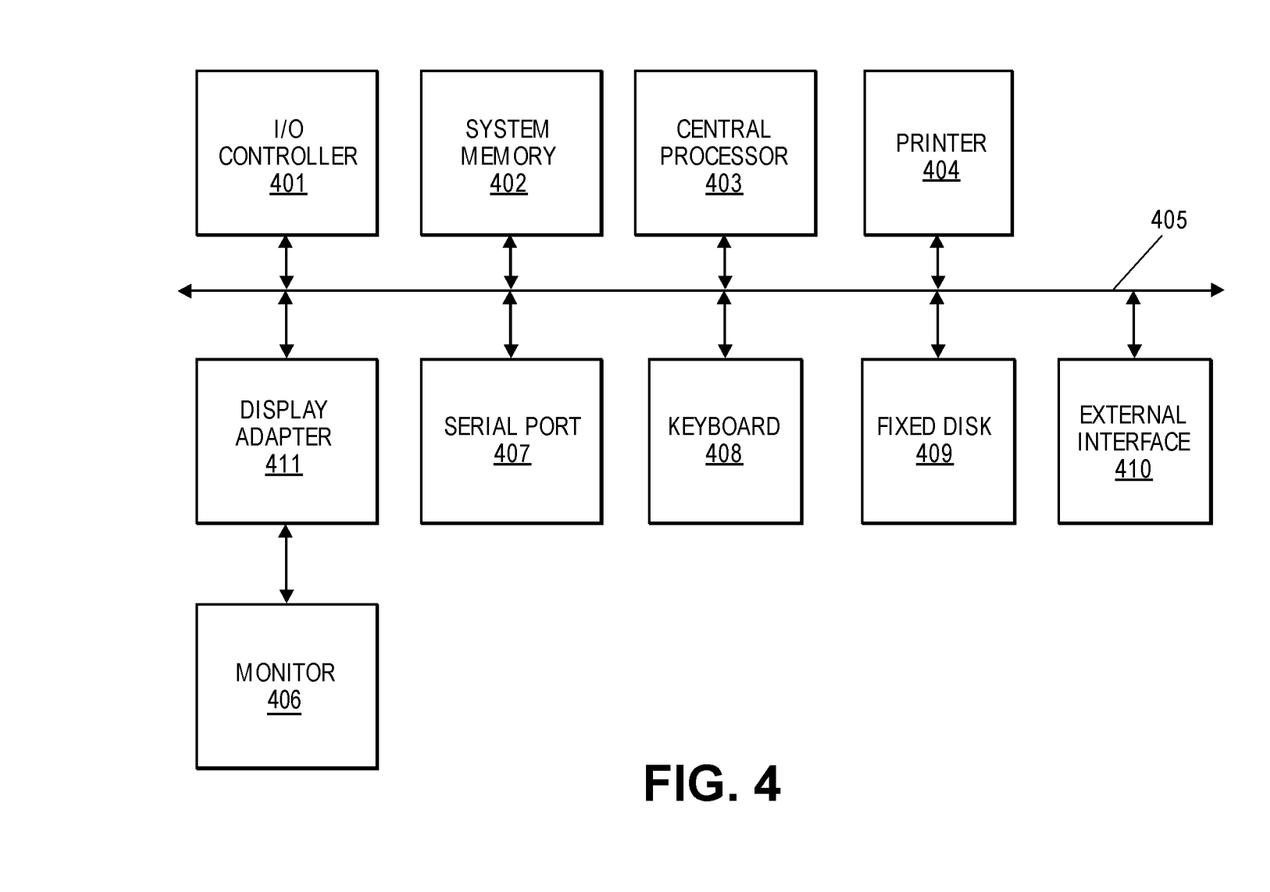
FIG. 4 shows an exemplary computer system according to embodiments of the present invention.

The various participants and elements shown in FIGS. 1-3 may operate one or more computer apparatuses (e.g., a server computer) to facilitate the functions described herein. Any of the elements in FIGS. 1-3 may use any suitable number of subsystems to facilitate the functions described herein. Examples of such subsystems or components are shown in FIG. 4. The subsystems such as a printer 404, keyboard 408, fixed disk 409 (or other memory comprising computer readable media), monitor 406, which is coupled to a display adapter 411, and others are shown. Peripherals and input/output (I/O) devices, which couple to I/O controller 401, can be connected to the computer system by any number of means known in the art, such as serial port 407. For example, serial port 407 or external interface 410 can be used to connect the computer apparatus to a wide area processing server computer. such as the Internet, a mouse input device, or a scanner. The interconnection via system bus 405 allows the central processor 403 to communicate with each subsystem and to control the execution of instructions from system memory 402 or the fixed disk 409, as well as the exchange of information between subsystems.

Specific details regarding some of the above-described aspects are provided below. The specific details of the specific aspects may be combined in any suitable manner without departing from the spirit and scope of embodiments of the invention.

Storage media and computer readable media for containing code, or portions of code, may include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which may be used to store or transmit the desired information and which may be accessed by the computer. Based on the disclosure and teachings provided herein, a person of ordinary skill in the art may appreciate other ways and/or methods to implement the various embodiments.

It may be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware and a combination of hardware and software Any of the software components or functions described in this application, may be implemented as software code to be executed by a processor using any suitable computer language such as, for example, JAVA, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or processing server computer.

The above description is illustrative and is not restrictive. Many variations of the invention may become apparent to those skilled in the art upon review of the disclosure. The scope of the invention may, therefore, be determined not with reference to the above description, but instead may be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

What is claimed is:

1. A method comprising:
receiving, by a transaction processing server computer, an account update message from an issuer of an account, the account update message including updated information associated with the account, wherein the account update message identifies one or more merchants that are authorized to obtain the updated information from the transaction processing server computer;
storing, by the transaction processing server computer, the updated information associated with the account, and the one or more merchants that are authorized to obtain the updated information at a database along with a flag indicating that an entry associated with the account has been modified;
upon receiving and storing the updated information associated with the account, receiving, by the transaction processing server computer, an authorization request message associated with a transaction from a merchant, the authorization request message including information associated with the account, the authorization request message requesting approval for the transaction using the account;
in response to receiving the authorization request message and without communicating with the issuer of the account in connection with the approval of the transaction:
querying, by the transaction processing server computer, the database;
determining, by the transaction processing server computer, that the account is associated with the updated information based on the flag stored on the database in connection with the entry associated with the account; and
modifying, by the transaction processing server computer, the authorization request message to replace the information with the updated information thereby generating a modified authorization request message including the updated information;
processing, by the transaction processing server computer, the modified authorization request message, wherein the processing includes:
sending, by the transaction processing server computer, the modified authorization request message to the issuer of the account; and
receiving, by the transaction processing server computer from the issuer of the account, a response message including an indicator indicating whether the transaction is approved or denied;
generating, by the transaction processing server computer, an authorization response message including the updated information and the indicator indicating whether the transaction is approved or denied;
prior to sending the authorization response message including the updated information to the merchant, determining, by the transaction processing server computer, that the merchant is identified in the account update message as being authorized to receive the updated information; and
sending, in response to the authorization request message and by the transaction processing server computer to the merchant, the authorization response message including the updated information and the indicator indicating whether the transaction is approved or denied, sending including:
transmitting, by the transaction processing server computer, the updated information to the merchant as part of the authorization response message upon determining that the merchant is authorized to receive the updated information.

2. The method of claim 1, wherein the authorization response message further includes the information received from the merchant.

3. The method of claim 1, wherein the authorization response message further includes an indicator indicating that the information received from the merchant is replaced with the updated information.

4. The method of claim 1, further comprising:
determining, by the transaction processing server computer, that the account with the updated information is allowed to be used in the transaction prior to modifying the authorization request message to include the updated information.

5. The method of claim 1, wherein the merchant stores the information associated with the account in a storage.

6. The method of claim 5, wherein the merchant replaces, in the storage, the information associated with the account with the updated information provided in the authorization response message.

7. The method of claim 1, further comprising:
determining, by the transaction processing server computer, that the information associated with the account provided in the authorization request message received from the merchant is deactivated.

8. A transaction processing server computer comprising:
a processor; and
a computer readable medium coupled to the processor, the computer readable medium comprising code, executable by the processor, to implement a method comprising:
receiving an account update message from an issuer of an account, the account update message including updated information associated with the account, wherein the account update message identifies one or more merchants authorized to obtain the updated information from the transaction processing server computer;
storing the updated information associated with the account, and the one or more merchants that are authorized to obtain the updated information at a database along with a flag indicating that an entry associated with the account has been modified;
upon receiving and storing the updated information associated with the account, receiving an authorization request message associated with a transaction from a merchant, the authorization request message including information associated with the account, the authorization request message requesting approval for the transaction using the account;
in response to receiving the authorization request message and without communicating with the issuer of the account in connection with the approval of the transaction:
querying the database;
determining that the account is associated with the updated information based on the flag stored on the database in connection with the entry associated with the account; and modifying the authorization request message to replace the information with the updated information thereby generating a modified authorization request message including the updated information;
processing the modified authorization request message, wherein the processing includes:
sending the modified authorization request message to the issuer of the account; and
receiving, from the issuer of the account, a response message including an indicator indicating whether the transaction is approved or denied;
generating an authorization response message including the updated information and the indicator indicating whether the transaction is approved or denied;
prior to sending the authorization response message including the updated information to the merchant, determining that the merchant is identified in the account update message as being authorized to receive the updated information; and
in response to the authorization request message, sending, to the merchant, the authorization response message including the updated information and the indicator indicating whether the transaction is approved or denied, sending including:
transmitting the updated information to the merchant as part of the authorization response message upon determining that the merchant is authorized to receive the updated information.

9. The transaction processing server computer of claim 8, further comprising:
the database for storing the information associated with the account, wherein when the transaction processing server computer receives an account update message from the issuer of the account, the transaction processing server computer updates the information associated with the account on the database using the updated information, wherein the account update message indicates that the information associated with the account is modified.

10. The transaction processing server computer of claim 8, wherein the authorization response message further includes one or more of the information received from the merchant, and an indicator indicating that the information received from the merchant is replaced with the updated information.

11. The transaction processing server computer of claim 8, wherein the method implemented by the code further comprises determining that the account with the updated information is allowed to be used in the transaction prior to modifying the authorization request message to include the updated information.

12. The method of claim 1, wherein the updated information associated with the account includes at least one or more of an account number, a security code and user identifying information.

13. The method of claim 1, wherein the merchant receives the information associated with the account via near-field communications with a user device, and stores the information associated with the account in a storage.

* * * * *